(12) United States Patent
Nevarez et al.

(10) Patent No.: US 7,954,422 B2
(45) Date of Patent: *Jun. 7, 2011

(54) COOKING APPARATUS AND METHOD WITH PRODUCT RECOGNITION

(75) Inventors: Roberto Nevarez, Hudson, FL (US); Douglas S. Jones, New Port Richey, FL (US); Jan Claesson, Land O'Lakes, FL (US); Ryan J. Stephens, Dallas, PA (US); David W. Harter, New Port Richey, FL (US)

(73) Assignee: Enodis Corporation, New Port Richey, FL (US)

( * ) Notice: Subject to any disclaimer, the term of this patent is extended or adjusted under 35 U.S.C. 154(b) by 1450 days.

This patent is subject to a terminal disclaimer.

(21) Appl. No.: 11/146,685

(22) Filed: Jun. 7, 2005

(65) Prior Publication Data

US 2005/0279222 A1 Dec. 22, 2005

Related U.S. Application Data

(63) Continuation-in-part of application No. 11/070,348, filed on Mar. 2, 2005.

(60) Provisional application No. 60/549,233, filed on Mar. 2, 2004.

(51) Int. Cl.
*A47J 27/62* (2006.01)
*A47J 37/06* (2006.01)

(52) U.S. Cl. .............. 99/349; 99/374; 99/379; 99/422

(58) Field of Classification Search ............ 99/327–334, 99/349–351, 348, 372–485; 426/520–523; 219/521–525, 386
See application file for complete search history.

(56) References Cited

U.S. PATENT DOCUMENTS

| 3,948,159 | A | * | 4/1976 | Vigerstrom ................ 99/358 |
| 4,483,239 | A | * | 11/1984 | Mueller et al. ............. 99/340 |
| 4,627,335 | A | | 12/1986 | Sherman et al. ............ 99/325 |
| RE32,994 | E | | 7/1989 | Adamson et al. ............ 99/332 |
| 5,363,748 | A | * | 11/1994 | Boehm et al. ............... 99/372 |
| 5,473,976 | A | | 12/1995 | Hermansson |
| 5,555,794 | A | | 9/1996 | Templeton |
| 5,847,365 | A | | 12/1998 | Harter et al. ................ 219/492 |

(Continued)

FOREIGN PATENT DOCUMENTS

JP 57114342 A 7/1982

(Continued)

OTHER PUBLICATIONS

Supplementary European Search Report dated Mar. 4, 2008 based on EP application No. EP05724290.

(Continued)

*Primary Examiner* — Quang T Van
(74) *Attorney, Agent, or Firm* — Ohlandt, Greeley, Ruggiero & Perle, L.L.P.

(57) ABSTRACT

Cooking apparatus having first and second platens with product recognition. A positioning mechanism moves the second platen toward the first. A detector senses the second platen making contact with a food product disposed on the first platen and provides a signal. A controller uses the signal to measure the travel distance of the second platen. The product thickness is a function of the travel distance, which is used to select a cooking procedure for the food product. The controller then executes the selected cooking procedure to cook the food product. The detector can include a micro switch, proximity sensor, touch sensor, strain sensor, thermal sensor, optical sensor, sonar sensor or positioning load change sensor.

10 Claims, 13 Drawing Sheets

U.S. PATENT DOCUMENTS

| | | | | |
|---|---|---|---|---|
| 5,934,182 A | 8/1999 | Harter et al. | | 99/349 |
| 6,016,743 A | 1/2000 | Galvan | | 99/349 |
| 6,079,321 A | 6/2000 | Harter et al. | | 99/349 |
| 6,148,718 A | 11/2000 | D'Alterio | | 99/349 |
| 6,263,786 B1 * | 7/2001 | Raio et al. | | 99/349 |
| 6,401,601 B1 * | 6/2002 | Wu | | 99/331 |

FOREIGN PATENT DOCUMENTS

| | | |
|---|---|---|
| JP | 8202451 A | 8/1996 |
| JP | 11009466 A | 1/1999 |
| JP | 2001250462 A | 9/2001 |
| SU | 1558291 | 4/1990 |

OTHER PUBLICATIONS

International Search Report and Written Opinion dated Jul. 7, 2008 based on PCT application No. PCT/US06/09352.

International Search Report and Written Opinion dated Aug. 31, 2007 based on PCT application No. PCT/US06/21241.

Communication dated Nov. 24, 2009 issued by the Russian Federation Patent Office in corresponding Russian Patent Application No. 2007138008/12.

* cited by examiner

Beam can move downward after platen casing and platen stop on product. Fastener is mounted to platen cover, and floats in Beam allowing travel of beam Platen motion to be stopped by product.

COOKING APPARATUS AND METHOD WITH PRODUCT RECOGNITION

RELATED APPLICATION

This application is a continuation-in-part of U.S. patent application Ser. No. 11/070,348 filed Mar 2, 2005, which application claims the benefit of U.S. Provisional Patent Application Ser. No. 60/549,233, filed on Mar. 2, 2004.

FIELD OF THE INVENTION

This invention relates to a cooking apparatus and method in which the relative motion of two platens is automatically controlled.

BACKGROUND OF THE INVENTION

Cooking apparatus that includes two surfaces generally cooks by contacting opposed sides of a food product. Cooking apparatus of this type has been used in a variety of cooker styles. For example, a clam grill uses a lower platen and an upper platen that is moveable toward and away from the lower platen. Examples of clam grills are disclosed in U.S. Pat. No. 6,079,321 and Re 32,994. Another style is a toaster in which one surface is a platen and the other surface is a conveyor belt. The conveyor belt and the platen can be either horizontal, vertical or at an angle therebetween. Examples of toasters are disclosed in U.S. Pat. Nos. 6,201,218 and 6,281,478.

These known cooking apparatuses generally include a motion mechanism that either manually or automatically moves one platen toward another until opposed sides of the food product are contacted by the platens. For example, the clam grill disclosed in U.S. Pat. No. 6,079,321 automatically controls the motion based on a set of parameters that must be input to a controller for each type of food product. These parameters include a preset gap distance, which is the cooking distance between the two platens to accommodate food products of different thicknesses. These gap distances are set by manually inputting the preset gap distance setting into the grill control and assigning the setting to a gap button on the user interface control along with a cooking time. This set of cooking parameters (gap distance and cooking time) must be preselected before placing the food product on the grill surface.

The clam grill operator must also input the type of food product being cooked so that the controller uses the parameter set for that food product. Should the operator inadvertently input the wrong type, the upper platen may not contact the food product or may put too much pressure on the food product. Since the parameter set also includes the cook time for the food product type, the food product could be undercooked or over cooked. Thus, there is opportunity for human error at the time of entry of the preset gap distances as well as at the time of selecting the type of food being cooked.

There is a need for a cooking apparatus that automatically controls the relative motion of the two platens in a manner that avoids user error.

SUMMARY OF THE INVENTION

The cooking apparatus of the present invention comprises a first platen and a second platen and a positioning mechanism that moves the second platen toward and/or away from the first platen. A detector is disposed to provide a signal in response to detection of an impediment to the motion of the second platen. A controller controls the positioning mechanism (a) to move the second platen toward the first platen and (b) to stop the second platen in response to the signal.

In one embodiment of the present invention, the impediment is the first platen and the signal is provided as the second platen makes contact with the first platen.

In another embodiment of the present invention, the controller in a preheat mode further controls a heater to apply thermal energy to at least one zone of the first platen and to the second platen.

In another embodiment of the present invention, the controller controls the positioning mechanism to maintain the second platen in contact with the first platen until the zone of the first platen attains a first preset temperature and the second platen attains a second preset temperature.

In another embodiment of the present invention, the controller during each preheat mode records a position of the second platen attained as it is stopped by the positioning mechanism as a reference position, and wherein the controller uses the recorded reference position during ensuing cook cycles to recognize a thickness of a food product disposed on the first platen.

In another embodiment of the present invention, the impediment is an object detected between a non-cooking position and a cooking position of the second platen. The controller further responds to the signal by controlling the positioning mechanism to move the second platen away from the first platen to a non-cooking position.

In another embodiment of the present invention, one or more temperature sensors are disposed to sense one or more temperatures at one or more locations of the first platen. The impediment is a food product disposed on the first platen. The controller in a cook cycle uses the sensed temperatures to evaluate an amount of food product on the first platen surface and compensates a cook time of the cook cycle based on the amount of food product.

In another embodiment of the present invention, the controller determines the load sensitivity by evaluating a drop in the temperatures and compensates the cook time based on the drop and a rate of temperature recovery.

In another embodiment of the present invention, a temperature probe is manually disposable at the locations on a surface of the first platen and that is removably connected in circuit with the controller; wherein the controller calibrates surface temperature of the first platen based on temperature probe signals received from the manually disposed surface temperature probes. The locations on the surface preferably bear visible marks.

The method of the present invention controls a clam grill that has first and second platens by moving the second platen toward the first platen, providing a signal in response to a detection of an impediment to the motion of the second platen, and stopping the second platen in response to the signal.

In another embodiment of the method of the present invention, the impediment is the first platen and the signal is provided as the second platen makes contact with the first platen.

In another embodiment of the method of the present invention, in a preheat mode a heater is controlled to apply thermal energy to at least one zone of the first platen and to the second platen.

In another embodiment of the method of the present invention, the second platen is maintained in contact with the first platen until the zone of the first platen attains a first preset temperature and the second platen attains a second preset temperature.

In another embodiment of the method of the present invention, the method comprises the further steps of during each preheat mode recording a position of the second platen attained as it is stopped as a reference position, and using the recorded reference position during ensuing cook cycles to recognize a thickness of a food product disposed on the first platen.

In another embodiment of the method of the present invention, the impediment is an object detected between a non-cooking position and a cooking position of the second platen. The second platen is then moved away from the first platen in response to the signal.

In another embodiment of the method of the present invention, the second platen is moved to a non-cooking position.

In another embodiment of the method of the present invention, the method further comprises the steps of sensing one or more temperatures at one or more locations of the first platen. If the impediment is a food product disposed on the first platen; then the method uses the sensed temperatures to evaluate an amount of food product on the first platen and compensates a cook time of the cook cycle based on the amount of food product.

In another embodiment of the method of the present invention, the method further comprises determining the load sensitivity by evaluating a drop in the temperatures and compensating the cook time based on the drop and a rate of temperature recovery.

In another embodiment of the method of the present invention, the method further comprises sensing one or more temperatures at one or more locations of the first platen, manually disposing a temperature probe at the locations on a surface of the first platen; and calibrating surface temperature of the first platen based on temperature probe signals received from the temperature probe.

In another embodiment of the method of the present invention, the locations on the surface bear visible marks.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

It is contemplated that the present invention can be used in various styles of two-surfaced cooking apparatus, for example, two-sided contact toasting, clam grills and the like. However, by way of example and completeness of description, the present invention will be described herein in a clam grill embodiment.

Figure 1:
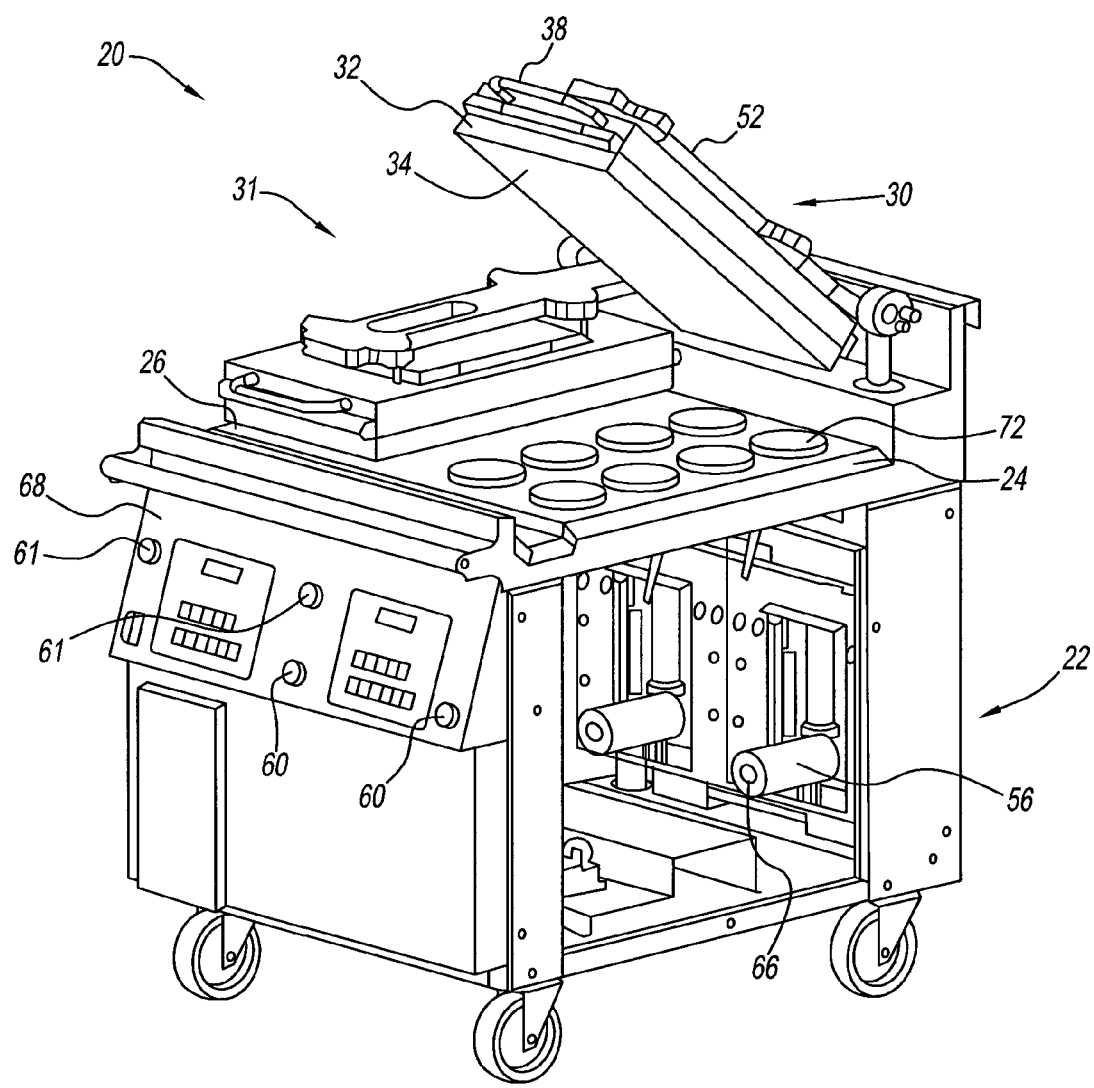
FIG. 1 is a perspective view of one embodiment of a two-surfaced cooking apparatus of the present invention.
Figure 2:
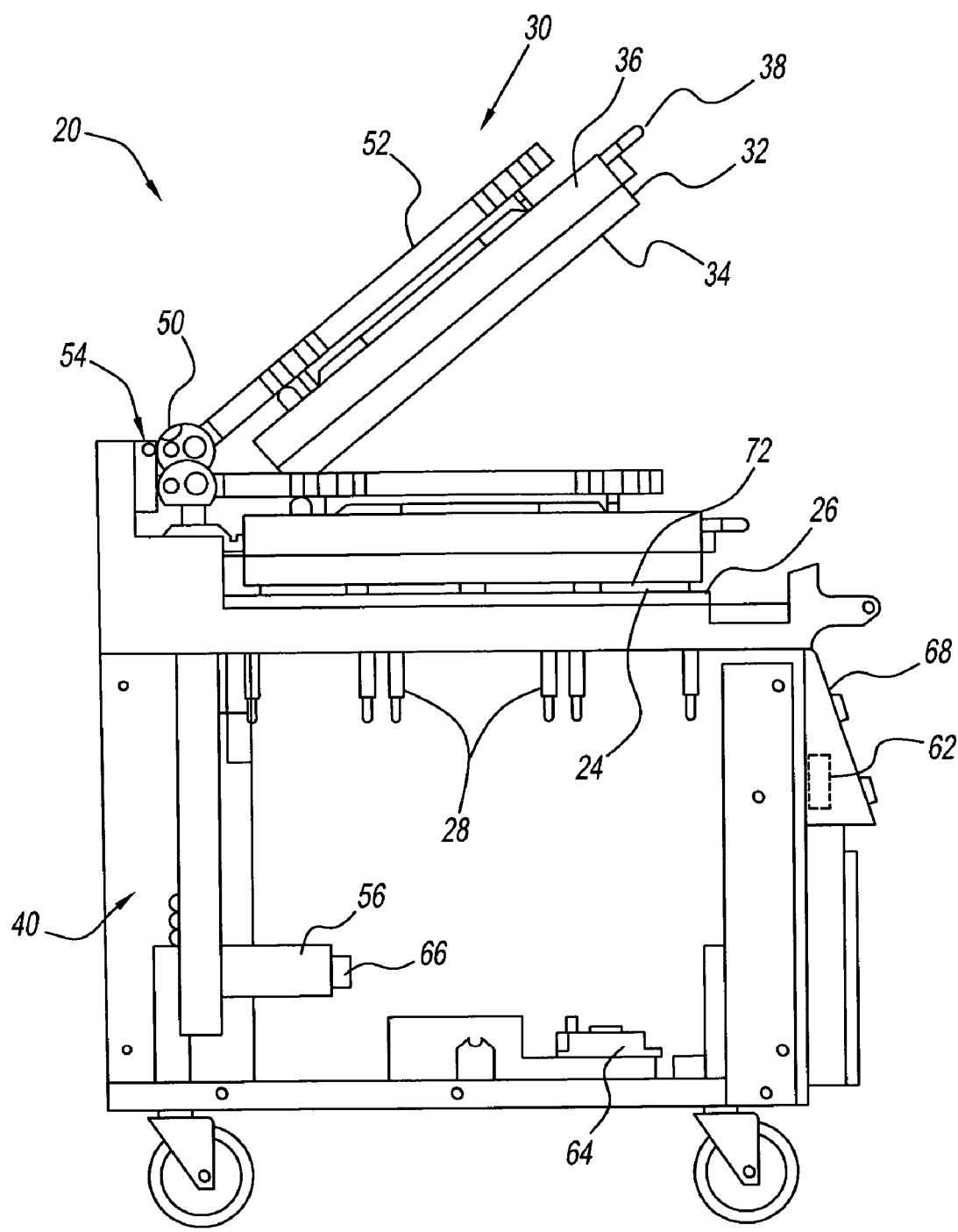
FIG. 2 is a side view of the two-surfaced cooking apparatus of FIG. 1.
Figure 3:
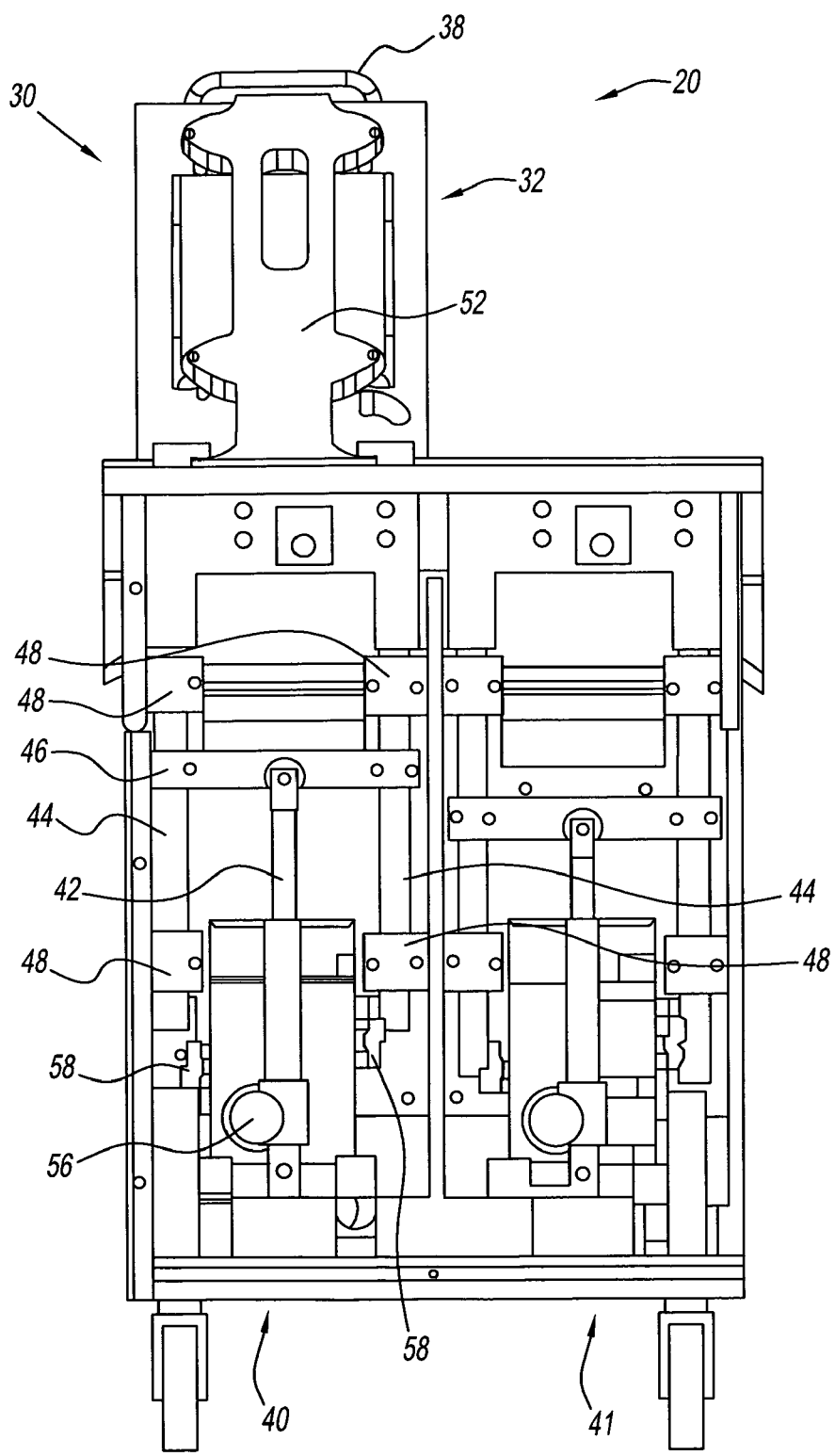
FIG. 3 is a rear view of the two-surfaced cooking apparatus of FIG. 1.

Referring to FIGS. 1-3, a two-surfaced cooking apparatus 20 of the present invention comprises a support structure 22 to which a lower (first) cooking platen 24 is horizontally mounted. Lower platen 24 has a smooth level cooking surface 26 on its upper side. Lower platen 24 is heated to cooking temperature by gas or electric means via heating elements 28 or equivalent gas burners.

A platen assembly 30 and a platen assembly 31 are movably mounted to the rear of support structure 22 by a positioning mechanism 40 and a positioning mechanism 41, respectively. As platen assembly 30 and platen assembly 31 are substantially identical, only platen assembly 30 will be described in detail. Platen assembly 30 comprises an upper (second) cooking platen 32 that has a surface 34. Preferably, surface 34 is heated to cooking temperature by heating elements (not shown) mounted within a casing 36. Upper platen 32 is either smaller than or equivalently sized to lower cooking platen 24. A handle 38 mounted on the front side of platen assembly 30 for manual manipulation thereof. Cooking apparatus 20 may have one or more upper platen assemblies. Although two upper platen assemblies are shown, other embodiments may have one or more than two upper platen assemblies. In a preferred embodiment, two or more separate upper platen assemblies are mounted over a single lower platen, allowing for greater flexibility for the cook/operator. Although lower platen 24 is shown as a single platen, it can be two or more platens in alternate embodiments.

Cooking apparatus 20 further includes a controller 62 (shown in FIG. 2) that is interconnected with heaters 28, a motor controller 64, a user interface 68 and one or two activation buttons 60. Controller 62 controls the cook cycle of cooking apparatus 20 and in so doing controls motor controller 64 and positioning mechanism 40 that imparts motion to platen assembly 30. User interface 68 includes a display and various user controls. Activation buttons 60 are disposed on the front of cooking apparatus for user control of platen assembly 30. Activation buttons 61 are disposed on the front of cooking apparatus for user control of platen assembly 31.

As positioning mechanism 40 and positioning mechanism 41 are substantially identical, only positioning mechanism 40 will be described in detail. Positioning mechanism 40 facilitates two distinct motions by platen assembly 30 between an uppermost or non-cooking position (see FIG. 3) to a cooking position. In FIGS. 1-3, platen assembly 30 is in the non-cooking position and platen assembly 31 is in the cooking position. In this embodiment, positioning mechanism 40 includes a linear actuator 42 that is linked to two vertical reciprocating shafts 44 by an actuator cross bar linkage 46. Actuator cross bar linkage 46 is clamped to vertical reciprocating shafts 44, which run through linear motion bearings 48. Vertical reciprocating shafts 44 are affixed to arm pivot/stop heads 50. A cantilever beam 52 runs through arm pivot/stop heads 50 through rotational pivot bearings 54. When platen assembly 30 is in its uppermost rotational position, linear actuator 42 is extended to its maximum position, vertical reciprocating shafts 44 and arm pivot/stop heads 50 are extended upward and to a position which forces the back end of cantilever beam 52 to contact rotational bearings 54. In this position, platen assembly 30 is at a predetermined angle in a range of about 45 degrees to about 60 degrees from the horizontal.

Positioning mechanism 40 further comprises a drive motor 56 and position sensor switches 58 (FIG. 3). Drive motor 56 is interconnected with motor controller 64. A pulse encoder 66 is associated with motor 56 and provides a pulse train to controller 62 when motor 56 is being driven. Position switches 58 are mounted on reciprocating shafts 44 to provide position information to controller 62. In alternate embodiments, position switches 58 may be eliminated.

Prior to a cook cycle, platen assembly 30 is in its non-cooking position. In response to user activation of activation buttons 60, controller 62 initiates a cook cycle by controlling motor controller 64 to drive motor 56 to cause positioning mechanism 40 to move platen assembly 30 from the non-cooking position to a cooking position. For example, platen assembly 31 is shown in the cooking position.

Positioning mechanism 40 causes platen assembly 30 to descend both vertically and through an arc caused by the cantilever weight of platen assembly 30 maintaining contact between rotational bearings 54 and the back of cantilever beam 52. When cantilever beam 52 and platen assembly 30 become parallel with lower platen 24, the stop portion of arm pivot/stop head 50 stops the rotational motion of cantilever beam 52 causing purely vertical motion of platen assembly 30 from this point and further down toward surface 26 of lower platen 24. When upper platen 32 makes contact with a food product 72, controller 62 responds by bringing upper platen 32 to an initial cooking position and initiating a cook procedure. During the cook procedure upper platen 32 may be moved based on the requirements of the cook procedure. For example, upper platen 32 may be moved due to changed food product thickness (loss of grease or water) or for applying more or less pressure to the food product at different times during the cook procedure.

When the cook procedure is completed, controller 62 controls motor controller 64 to drive linear actuator 42 to move platen assembly 30 vertically upward from the cooking position to the non-cooking position. The cantilever weight of upper platen 32 maintains contact between arm pivot/stop head 50 until the back of cantilever beam 52 makes contact with rotational pivot bearing 54. This movement ensures that platen assembly 30 is constantly parallel to lower platen 24 during this stage of upper platen travel. Once cantilever beam 52 makes contact with rotational pivot bearing 54 the vertical motion is changed to rotational motion to a point where platen assembly 30 is rotated through the predetermined angle to the non-cooking position. Controller 60 causes an audible signal to be sounded (e.g., about two seconds) prior to the start of upward movement of platen assembly 30 to alert the operator of impending upper platen movement.

The present invention provides a detector that provides a trigger signal as upper platen 32 makes contact with food product 72. Controller 62 responds to the trigger signal to control motor controller 64 to cause positioning mechanism 40 to bring upper platen 32 to the initial cooking position. At this time, controller 62 begins the cooking procedure. The detector is shown herein in several different embodiments.

Figure 4:
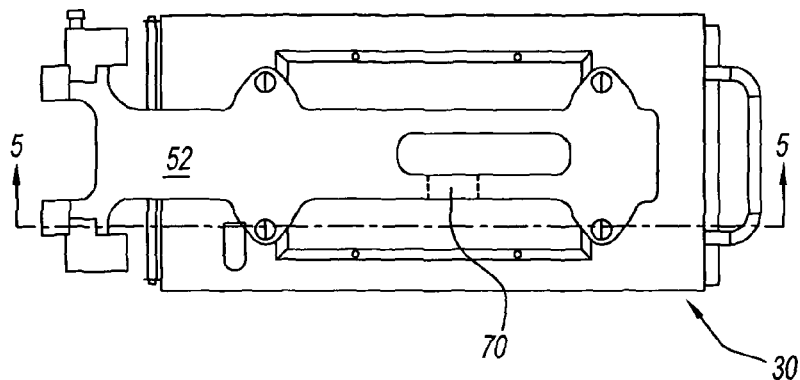
FIG. 4 is a top view of the upper platen assembly of the two-surfaced cooking apparatus of FIG. 1.
Figure 5:
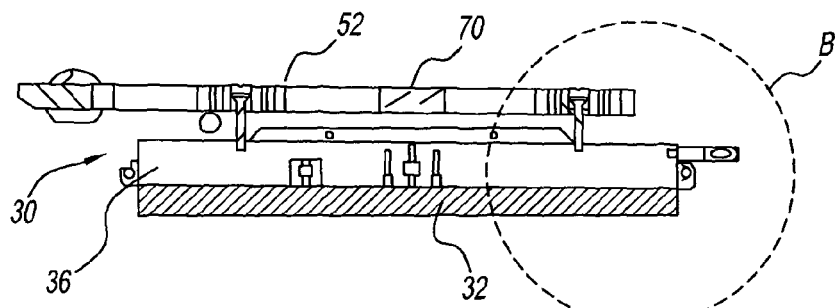
FIG. 5 is a cross-sectional view along line 5 of FIG. 4.
Figure 6:
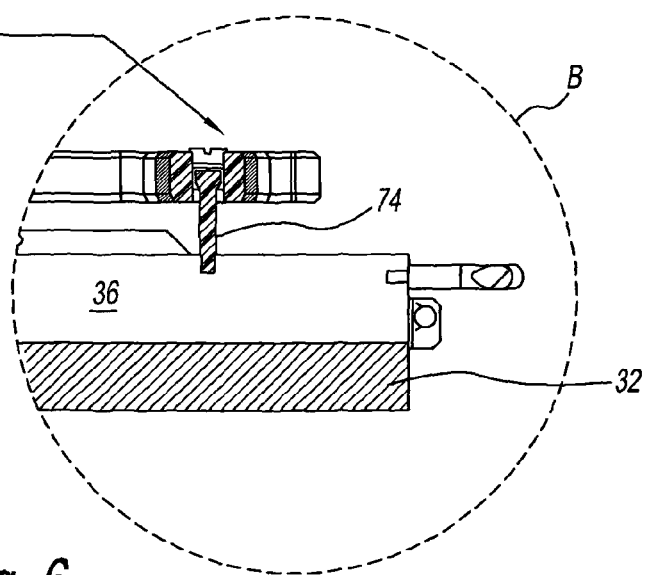
FIG. 6 is a view of detail B of FIG. 5.

Referring to FIGS. 4-6, a detector 70 is disposed or attached to cantilever beam 52 of positioning mechanism 40. When upper platen 32 stops moving because it makes contact with a food product, its motion comes to a stop or continues to move based on the cooking parameters inputted into controller 62. Positioning mechanism 40 continues to move cantilever beam 52 vertically downward toward casing 36. Detector 70 senses a small change in the distance between cantilever beam 52 and casing 36 to provide the trigger signal that triggers positioning mechanism 40 to bring upper platen 32 to the initial cooking position.

Referring to FIG. 6, a fastener 74 fastens cantilever beam 52 to casing 36. Fastener 74 is mounted in cantilever beam 52 in a manner that allows it to float vertically when upper platen 32 is in contact with food product 72. Thus, when upper platen 32 makes contact with food product 72, upper platen 32 stops but cantilever beam 52 continues downwardly due to the floating action of fastener 74.

In this embodiment, detector 70 is preferably a proximity sensor, for example, model PRX+4400, available from Hermetic Switch Inc. Detector 70 may alternatively be a microswitch, for example, model E47BM530, available from Eaton/Cutler Hammer.

Detector 70 may alternatively be a touch sensor including dielectric sensing as well as piezo-electric pressure sensing. For example, the touch sensor may be model T107-A4E-073, available from Piezo Systems, Inc.

Detector 70 may alternatively be a sonar sensor that is attached to upper platen 32, lower platen 24 or support structure 22 to detect a sound change due to upper platen 32 contacting the food product. For example, the sonar sensor may be model EFR-RTQB40KS, available from Panasonic.

Although detector 70 is shown in a specific location, detector 70 can be positioned at any suitable location of cantilever beam 52 that permits detection of upper platen 32 contacting food product 72. For example, these locations include the front, back, either side, middle or other. In an alternate embodiment, detector 70 may include multiple detectors positioned at different locations.

Figure 7:
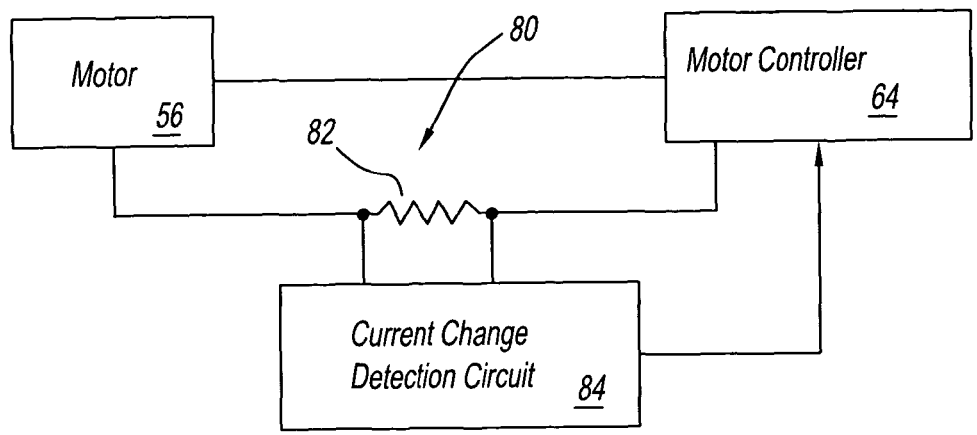
FIG. 7 is a block diagram of an alternate embodiment of the detector of the two-surfaced cooking apparatus of the present invention.

Referring to FIG. 7, a detector 80 monitors the motor current of drive motor 56. When upper platen 32 contacts food product 72, the motor current changes. Detector 80 detects this current change and signals motor controller 64. Detector 80 can either be separate from motor controller 64 or integral with motor controller 64. If integral, there is no need for detector 80 to signal motor controller 64. Detector 80 includes a current sensing resistor 82 (or other circuit for measuring current) connected in the motor current circuit. Detector 80 also includes a current change detection circuit 84 that provides the trigger signal to motor controller 64 when current change detection circuit 84 detects a change in motor current indicative of upper platen 32 making contact with food product 72. The trigger signal is supplied to controller 62.

Figure 8:
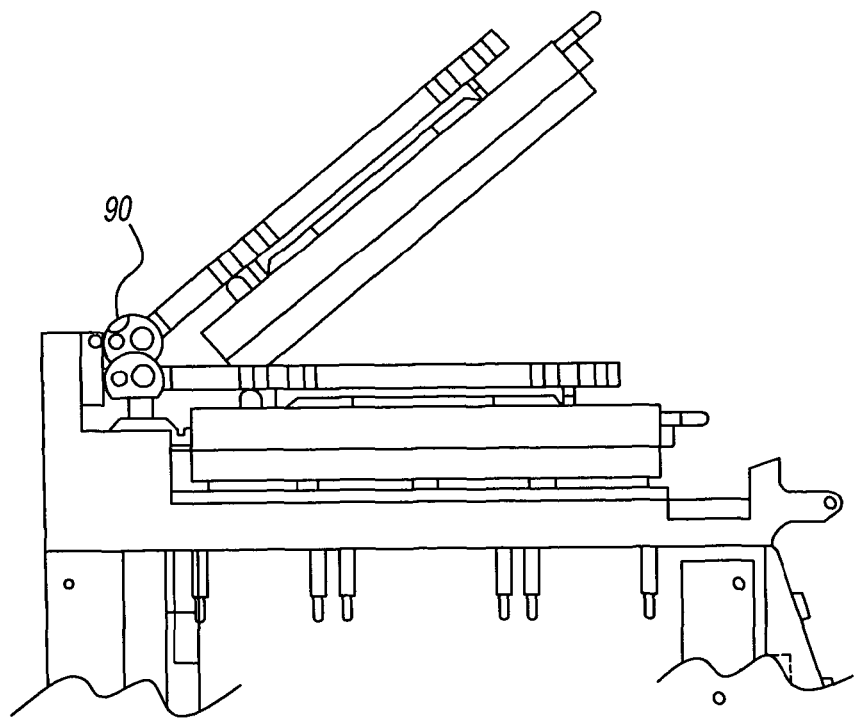
FIG. 8 is a side view of a portion of the two-surfaced cooking apparatus of FIG. 1 that depicts another embodiment of the detector.

Referring to FIG. 8, a detector 90 comprises a strain sensor attached in a location that detects a change in load after upper platen comes horizontal and when the weight of upper platen 32 is reduced by resting on food product 72. When detector 90 detects this change in strain, it provides a trigger signal to controller 62. Controller 62 then controls motor controller 64 to cause positioning mechanism 40 to bring upper platen 32 to the cooking position. Like detector 80, detector 90 may include a detection circuit (not shown) to detect when a change in the monitored strain signal is indicative of upper platen 32 making contact with food product 72.

Figure 9:
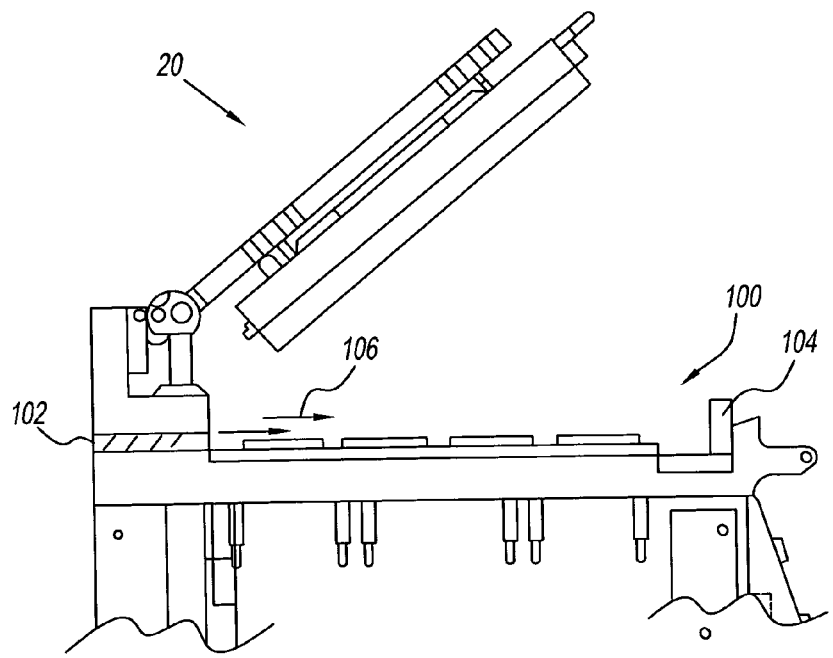
FIG. 9 is a side view of a portion of the two-surfaced cooking apparatus of FIG. 1 that depicts another embodiment of the detector.

Referring to FIG. 9, a detector 100 includes an optical transmitter 102 and an optical receiver 104 that are positioned to the rear and front, respectively, of cooking apparatus 20. Optical transmitter 102 provides an optical beam 106 from back to front at a level that will be interrupted by upper platen 32 at about the time it contacts the food product. Optical receiver 104 receives beam 106 and provides a trigger signal when upper platen 32 interrupts beam 106. Controller 62 uses the trigger signal to bring upper platen 32 to the cooking position. Optical beam 106 may be visible light or invisible, e.g., infrared.

Figure 10:
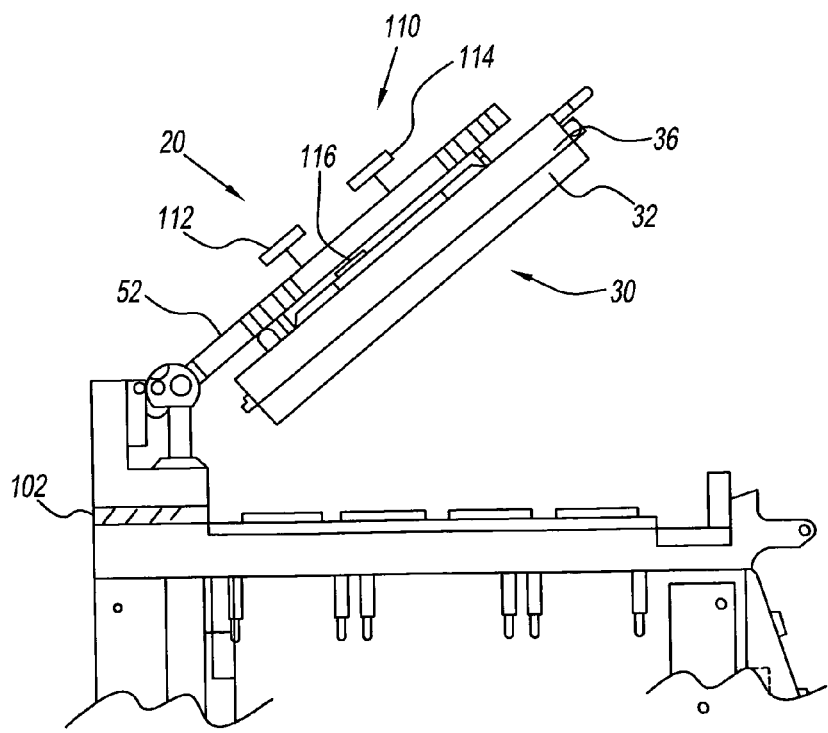
FIG. 10 is a side view of a portion of the two-surfaced cooking apparatus of FIG. 1 that depicts another embodiment of the detector.

Referring to FIG. 10, alternatively an optical detector 110 is mounted to cantilever beam 52. Thus, an optical transmitter 112 and an optical receiver 114 are mounted and spaced from one another by a gap such that a light beam emitted by optical transmitter 112 traverses the gap and is received by optical receiver 114. A shutter 116 is mounted on casing 36. When upper platen 32 is not in contact with the food product, shutter 116 is outside the gap between optical transmitter 112 and optical receiver 114. When upper platen 32 slows or stops, it contacts the food product, while cantilever beam 52 continues to move toward casing 36 such that shutter 116 enters the gap and interrupts the light beam. Optical receiver 114 responds by providing a trigger signal to controller 62. Controller 62 uses the trigger signal to bring upper platen 32 to the cooking position.

Figure 11:
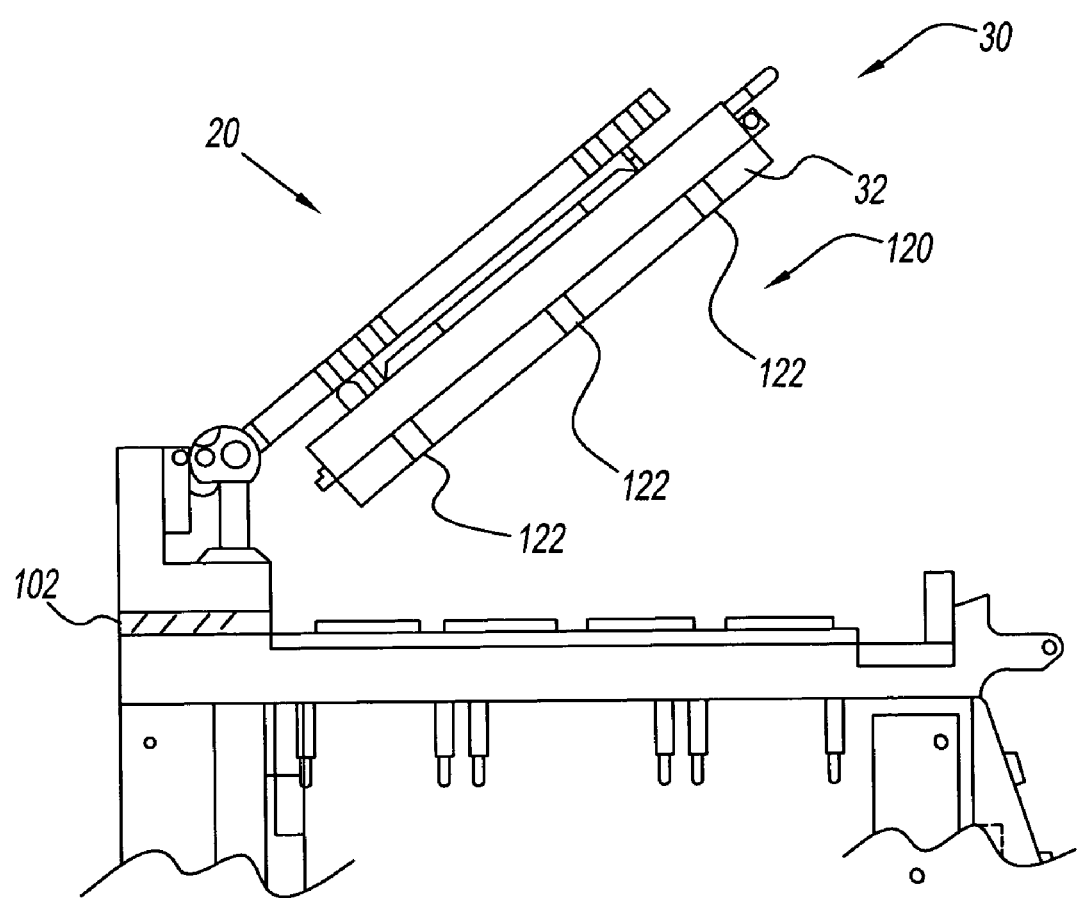
FIG. 11 is a side view of a portion of the two-surfaced cooking apparatus of FIG. 1 that depicts another embodiment of the detector.

Referring to FIG. 11, a detector 120 comprises a plurality of temperature sensors 122 disposed at various locations in upper platen 32. Temperature sensors 122 provide temperature signals to controller 62. When the operator starts a cooking cycle, controller 62 monitors the temperature sensor signals. When controller 62, based on the temperature sensor signals, determines that a given temperature drop in a specified amount of time has occurred, it controls motor controller 64 to cause positioning mechanism 40 to bring upper platen 32 to the cooking position.

It will be apparent to those skilled in the art that detection circuits can be used in any of the detectors 70, 80, 90, 100, 110 and 120 to discriminate the trigger signal from noise.

Figure 12:
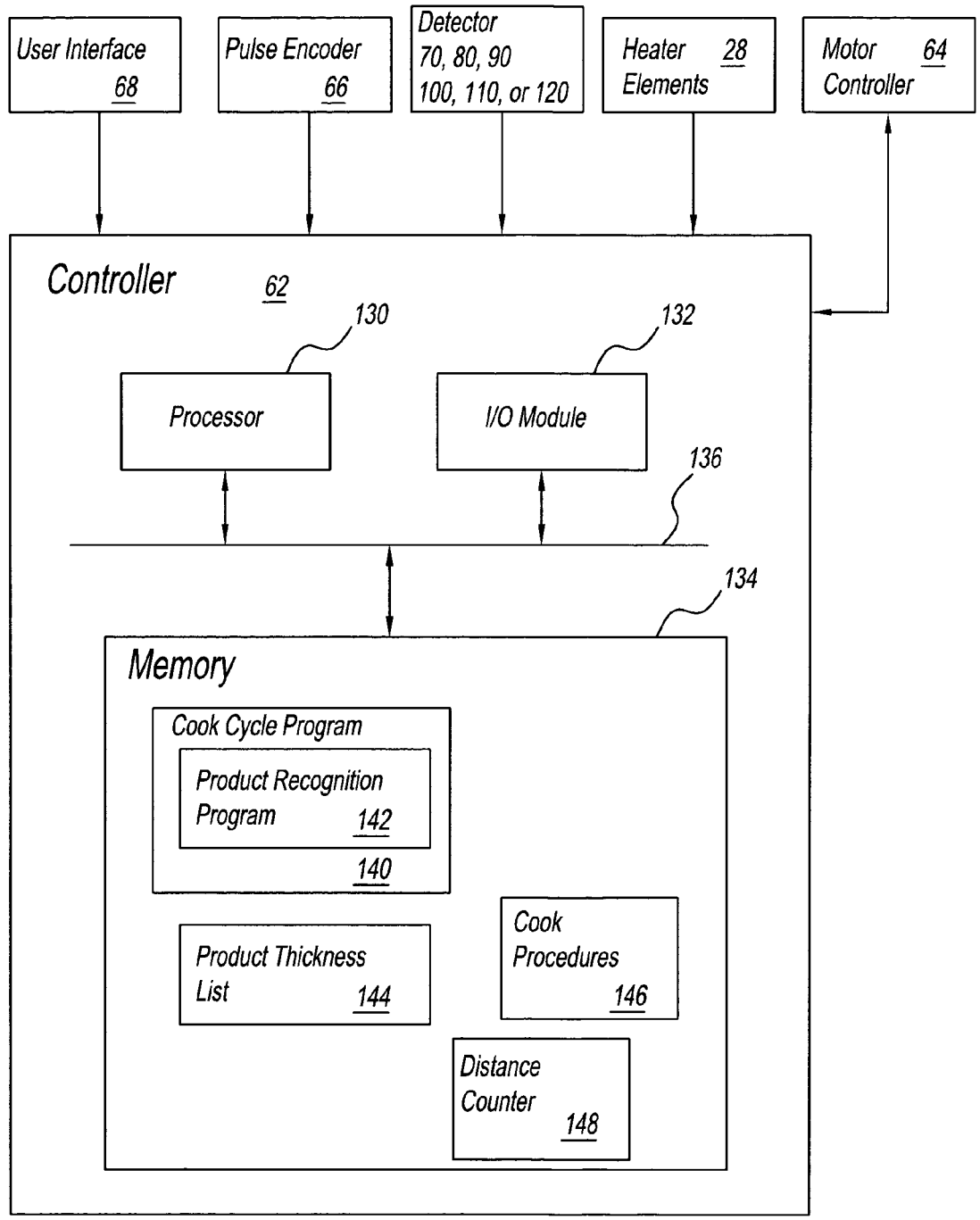
FIG. 12 is a block diagram of a preferred embodiment of the controller of the cooking apparatus of FIG. 1.

Referring to FIG. 12, controller 62 includes a processor 130 interconnected by a bus 136 with an input/output (I/O) module 132 and a memory 134. Memory 134 may be any suitable memory that includes, random access memory (RAM), read only memory (ROM), flash or other memory types or any combination thereof. Processor 130 may be any suitable processor that is capable of running programs that execute cook cycles including cook procedures. I/O module 132, contains interfaces to each of a plurality of input/output devices, including user interface 68, pulse encoder 66, detector 70, 80, 90, 100, 110 or 120, heater elements 28, motor controller 64 and any other input/output devices included in a cooking apparatus.

Memory 134 stores a plurality of programs and parameter data including a cook cycle program 140, a product thickness list 144, a set of cook procedures 146 and a distance counter 148. Cook procedures 146 include a set of cook procedures for use by cooking apparatus 20. For example, cook procedures 146 include a cook procedure for bacon, a cook procedure for a hamburger, a cook procedure for a chicken patty and so on.

A cook procedure, for example, may simply be a cook time or may also include temperatures for different portions of the cook time, different pressures and/or gap distances for upper platen at different portions of the cook time.

Cook cycle program 140 includes a product recognition program 142 that recognizes a food product 72 currently on the grill surface 26 of lower platen 24 of FIGS. 1-6. This recognition is based on a travel distance of upper platen 32 measured between a reference point to a position at which it makes contact with food product 72. When cooking apparatus 20 is first started from a cold start, a preheat mode is used before food product 72 can be placed on lower platen 24. In the preheat mode, platen assembly 30 is lowered until it comes to a stop on lower platen 24 and engages detector 70. The heaters for lower platen 24 and upper platen 32 are turned on and the platen surfaces are heated to their preset temperatures. This procedure has the advantage of saving energy vis-à-vis a procedure in which lower platen 24 and upper platen are out of contact with one another during the preheat mode.

After upper platen 32 has been preheated, platen assembly 30 is raised to its upper most non-cooking position to allow the operator to safely place food product 72 on lower platen 24. As platen assembly 30 begins to rise, cantilever beam 52 reaches the end of the float distance, detector 70 is released from its detected state and generates a trigger signal that controller 62 uses as the reference point. This reference point represents a reference count value, e.g., zero, of surface 26 of lower platen 24.

As platen assembly 30 continues to rise, encoder pulses are counted from the reference point to the non-cooking position. Controller 62 records the total count value from the reference point to the upper most non-cooking position, which represents a predetermined reference count value. After food product 72 is placed on lower platen 24, platen assembly 30 is again lowered. When upper platen 32 contacts food product 72, detector 70 generates a trigger signal, which controller 62 uses to record the encoder pulse count value at the time of contact with food product 72. The product thickness is represented by the difference between the pulse count value at the food product contact time and the predetermined reference count value.

It will be apparent to those skilled in the art that other techniques of measuring the travel distance can be used. For example, the travel distance can be measured by the time that elapses between current triggered count value and the reference point value. The elapsed time, for example, is measured by counting pulses from a timing source, such as a clock. This elapsed time or pulse count is recorded in distance counter 148. Product recognition program 142 uses distance to recognize a product thickness and uses the recognized product thickness to select a product cook procedure from cook procedures 146 that matches the product thickness.

The above described procedure of establishing a zero reference value of surface 26 of lower platen 24 provides a self-calibration every time a preheat mode is performed, e.g., upon each power up of cooking apparatus 20. This is in contrast to systems in which calibration is performed only at time of installation or service. These systems are subject to drift that can affect the calibration. For example, the drift might be due to component wear and/or aging, equipment abuse and/or changes in temperature, barometric pressure and/or humidity.

Figure 13:
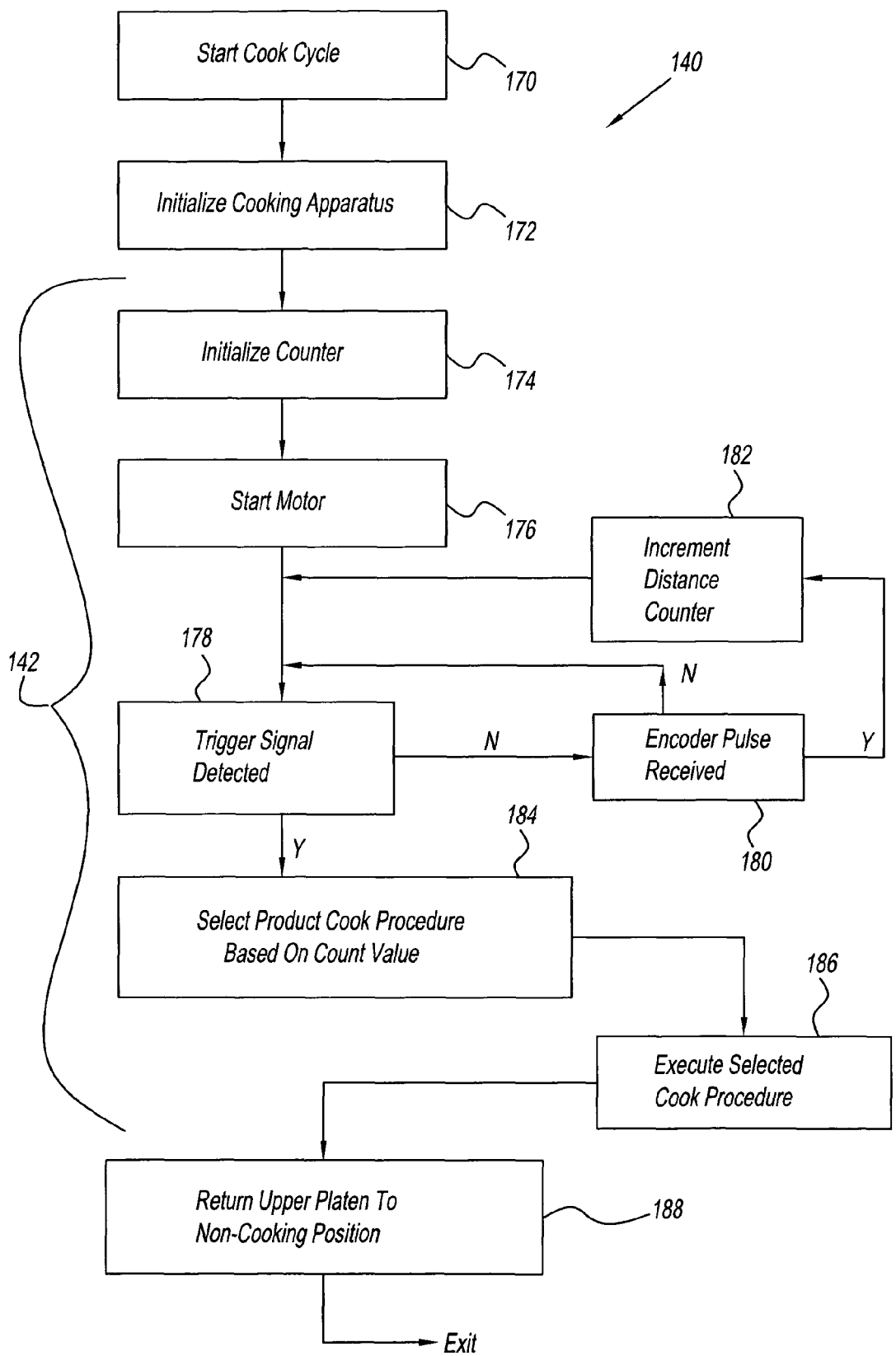
FIG. 13 is a flow diagram for the product recognition program of the controller of FIG. 12.
Figure 14:
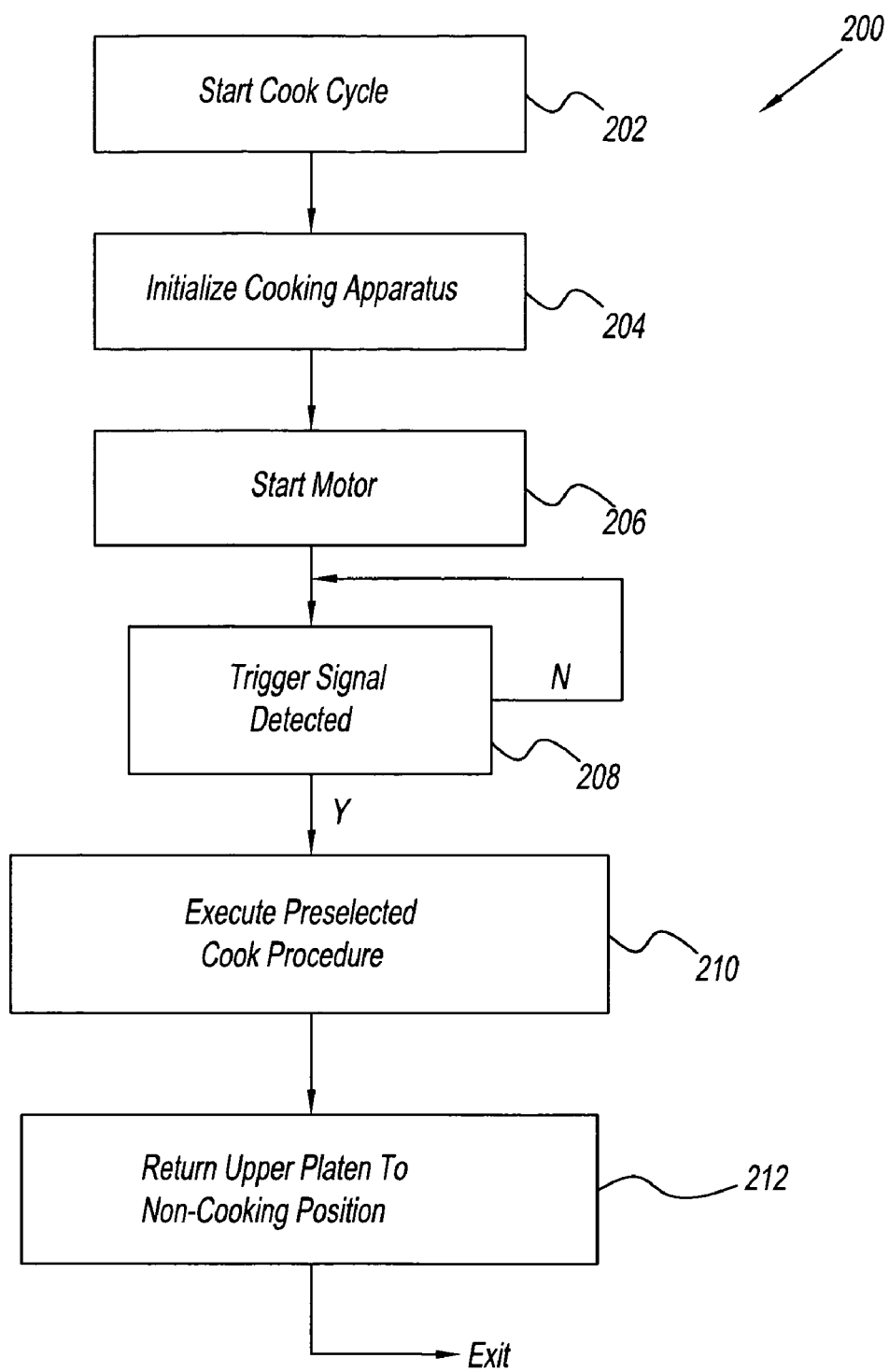
FIG. 14 is a flow diagram of another embodiment of a program that can be used with the cooking apparatus of FIG. 1.

Referring to FIG. 13, cook cycle program 140 begins at step 170 by starting a cook cycle. Step 170 is performed in response to the operator activating activation button 60. At step 172 cooking apparatus 20 is initialized. For example, heating elements 28 are turned on and other preliminary operations (not germane to the present invention) are performed. Once cooking apparatus 20 is initialized, product recognition program 142 is executed.

At step 174, distance counter 148 is initialized to a reference value, e.g., zero. At step 176 motor 56 is started. Processor 130 provides one or more command signals via I/O module 132 to motor controller 64 to provide drive current to motor 56. This causes positioning mechanism 40 to lower upper platen 32 from its non-cooking position. At step 178, there is a determination of whether a trigger signal has been received from the detector (70, 80, 110, 110 or 120). If not, at step 180 it is determined if an encoder pulse has been received. If not, control returns to step 178. If step 180 determines that an encoder pulse has been received, at step 182 distance counter 148 is incremented. It will be appreciated by those skilled in the art that distance counter 148 could also be decremented from the reference value. Control then returns to step 178 and steps 178, 180 and 182 iterate until step 178 detects a trigger signal.

If step 178 determines that a trigger pulse has arrived, at step 184 a product cook procedure is selected from cook procedures 146 based on the count value of distance counter 148 as of the arrival of the trigger pulse. At step 186 the selected cook program is executed. When step 186 is completed at step 188 upper platen 32 is returned to its non-cooking position. To perform step 188, processor 130 provides one or more command signals via I/O module 132 to motor controller 64 to provide drive current to motor 56. This causes positioning mechanism 40 to raise upper platen 32 from its cooking position to its non-cooking position.

More specifically, step 184 matches the trigger count value of distance counter 148 with count values for different product thicknesses for the food products stored in product thickness list 144. That is, each count value stored in product thickness list 144 is indicative of a corresponding product thickness of the food product of a corresponding cook procedure. If the trigger count value of distance counter 148 is in-between two of the count values in product thickness list 144, the count value closest to the trigger count value is used to select a corresponding cook procedure from cook procedures 146.

In an alternate embodiment, product thickness list 144 stores a thickness window for the product of each cook procedure. The thickness window is defined by an upper and a lower count value plus or minus a tolerance. The thickness window within which the trigger count value falls is used to select the corresponding cook procedure from cook procedures 146. If the trigger count value falls between two thickness windows, the closest thickness window is used. For example, the predetermined thickness could be 0.500±0.060 inch.

During a programming operation, product thickness list 144 and product cook procedures 146 are populated with respective thickness count values and cook procedures for the food products that are to be cooked with food cooking apparatus 20. The thickness count values and cook procedures can be entered, for example, via a keyboard or other input device (not shown) either via a wired connection or a wireless link.

Referring to FIG. 9, an alternate embodiment of the cook cycle program responds to the trigger signal to execute a cook procedure that is pre-selected by the operator, for example, from user interface 68. A cook cycle program 200 begins at step 202 by starting a cook cycle. Step 202 is performed in response to the operator activating activation button 60. At step 204 cooking apparatus 20 is initialized. For example, heating elements 28 are turned on and other preliminary operations (not germane to the present invention) are performed.

At step 206 motor 56 is started. Processor 130 provides one or more command signals via I/O module 132 to motor controller 64 to provide drive current to motor 56. This causes positioning mechanism 40 to lower upper platen 32 from its non-cooking position. At step 208, there is a determination of whether a trigger signal has been received from the detector (70, 80, 110, 110 or 120). If not, then step 208 repeats. If step 208 determines that a trigger signal has been received, then at step 208 the pre-selected cook procedure is executed. When the pre-selected cook procedure has been completed, then at step 212 upper platen 32 is returned to its non-cooking position. Processor 130 provides one or more command signals via I/O module 132 to motor controller 64 to provide drive current to motor 56. This causes positioning mechanism 40 to raise upper platen 32 from its cooking position to its non-cooking position.

Figure 15:
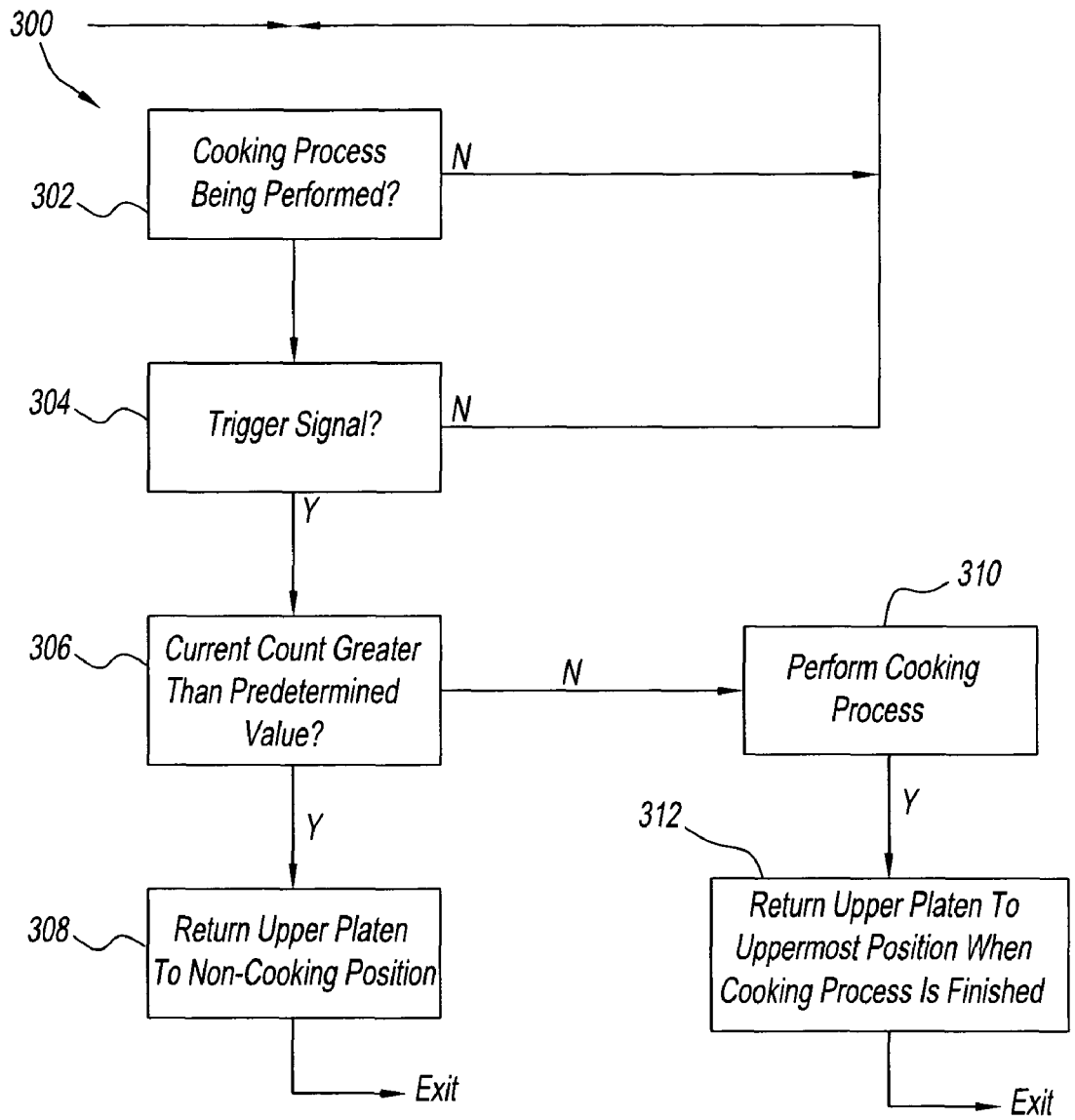
FIG. 15 is a flow diagram of a safety program that can be used with the cooking apparatus of FIG. 1.

Referring to FIG. 15, a safety feature program 300 is operative during the descent of upper platen 32 from the non-cooking position toward lower platen 24 to return upper platen to the non-cooking position should an obstruction or impediment be detected as upper platen 32 descends. The obstruction, for example, might be a body part of the operator, such as an arm or a hand, or a physical object other than food product 72, such as a pot, pan or other object. The presence of the objection is determined by controller 62 based on an input or trigger signal from detector 70.

When a cooking process is initiated, upper platen 32 moves downward toward lower platen 24. If at any time between the uppermost or non-cooking position and a predetermined distance above cooking surface 26, controller 62 receives a trigger signal from a detector, controller 62 stops upper platen 32, reverses its direction of motion and returns it to the uppermost position. The predetermined distance is greater than the food products being cooked. For example, the predetermined distance in one embodiment was set at 1.375 inch. The detector, for example, can be any of the detectors 70, 80, 90, 100 or any other suitable detector. For the purpose of the following description, the detector is assumed to be detector 70.

Safety feature program 300 is executed by controller 62 and at step 302 determines if a cooking process is being performed. If no, program 300 waits for a cooking process to start. If yes, at step 304, controller 62 determines if there is a trigger signal from detector 70. If no, steps 302 and 304 are repeated until a trigger signal is determined by step 304. If yes, at step 306 controller 62 determines if the current count is greater than a predetermined value that represents the predetermined distance above cooking surface 26. That is, the trigger signal has occurred above food product 72 and, therefore, was generated by an obstruction. If yes, controller 62 at step 308 stops the downward travel of upper platen 32 and moves it upward until it is returned to the uppermost position.

Should step 306 determine that the current count value is not greater than the predetermined value, controller 62 proceeds to perform the cook process at step 310. At step 312, controller 62 returns upper platen 32 to its uppermost position when the cook process is finished.

Figure 16:
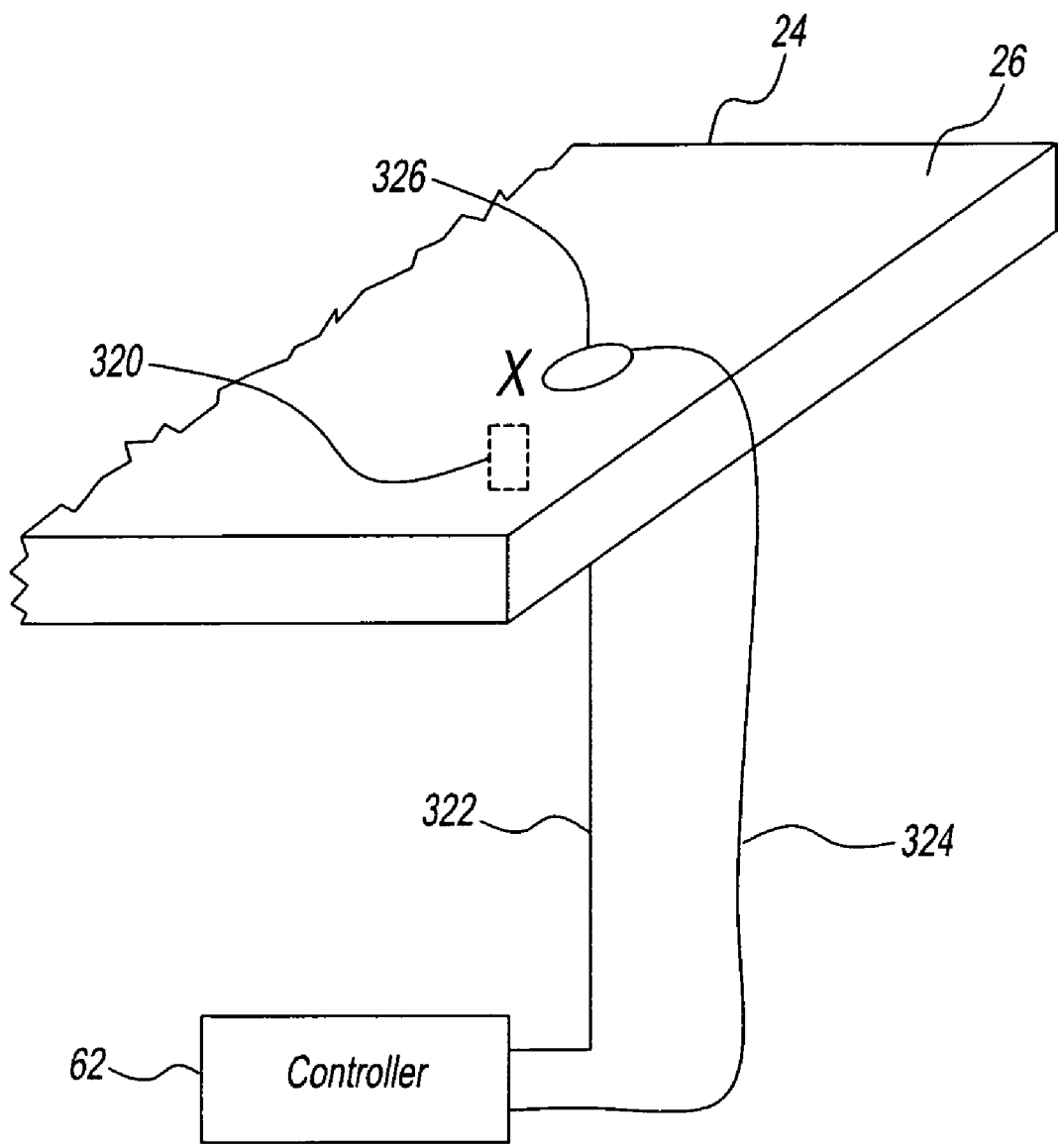
FIG. 16 depicts an auto-calibration set up for the cooking apparatus of FIG. 1.

Referring to FIG. 16, a zone of lower platen 24 comprises a mark X that denotes the location of a temperature probe 320 affixed to or inserted in a probe receptacle of a lower surface 27 of platen 24. Temperature probe 320 is connected to controller 62 via an electrical connection 322.

A feature of the present invention provides for automatic temperature calibration of surface 24 without having a person manually input the temperature values. Controller 62 is provided with a temperature calibration mode that is selectable, for example, by an operator using user interface 68. When the temperature calibration mode is selected, the operator places a temperature probe 326 near or in the vicinity of (e.g., over) the mark X that corresponds to the location of temperature probe 320. Although only one temperature probe 320 is shown, it should be apparent to those skilled in the art that one or more temperature probes 320 can be deployed at various locations of lower platen 24. Each such temperature probe 320 would be identified by a corresponding visible mark X.

The operator also plugs into controller 62 an electrical connection 324 that is connected to temperature probe 326. Controller 62 compares temperature values of surface 26 sensed by temperature probe 326 to temperature values received from temperature probes 320 and matches the value from the remote temperature probe 326 automatically calibrating temperature probes 320 without any manual inputs of temperature values into user interface 68. For example, controller 62 compares the temperatures sensed by temperature probe 326 with the temperatures sensed by corresponding temperature probes 320. Controller 62 uses the difference between the two temperatures as an offset value to determine surface temperature based on actual sensed temperature by temperature probe 320.

The present invention also comprises a load sensitivity feature that enables controller 62 to evaluate a temperature profile of a cooking cycle and, from this profile, determine the amount of food product 72 being cooked, and adjusting cooking time based on the amount of food product 72 on the grill surface 26. In one embodiment. The load sensitivity is rated in three categories, namely, a light load that requires a minimum cook time, a medium load that requires a nominal time, and a full load that requires a maximum time. As an example, the operator places one food product (e.g., a hamburger patty) 72 on lower grill surface 26 and initiates a cooking cycle by pressing a corresponding activation button 60 or 61. Upper platen 32 lowers until it contacts food product 72. When food product 72 is contacted, upper platen 32 stops and the lift mechanism continues downward slightly tripping a switch (detector 70, 80, 110 or 120) indicating upper platen 32 has stopped on food product 72. Controller 62 then determines the food product thickness and initiates a cooking cycle timer based on the product thickness. As food product 72 is being cooked the temperatures of surface 26 of the grill platen 24 and the surface 34 of upper platen 32 will drop due to the food product being colder than surfaces 26 and 34. As the surface temperatures drop, controller 62 monitors the temperature drop and recovery rate over time of surfaces 26 and/or 34 during the cooking process. Just prior to end of the cooking cycle, controller 62 determines the rate and amount of surface(s) temperature drop and rate of recovery. Using this data, controller 62 determines that there is a light load on the grill and shortens the cook time slightly so that food product 72 is not over cooked.

If the operator had placed the maximum amount of food products 72 on the grill surface and started a cooking cycle, the "temperature curve" of the grilling surfaces would drop further and recover at a slower rate. Near the end of the cooking cycle, controller 62 would evaluate this data, and extend the cooking time to compensate for the reduced thermal input to the full load of food products 72.

If a number of food products greater than one and less than a full load are placed on lower grill surface 26 and a cooking cycle is initiated, controller 62 will monitor a "temperature curve" for temperature drop and recovery rate.

Figure 17:
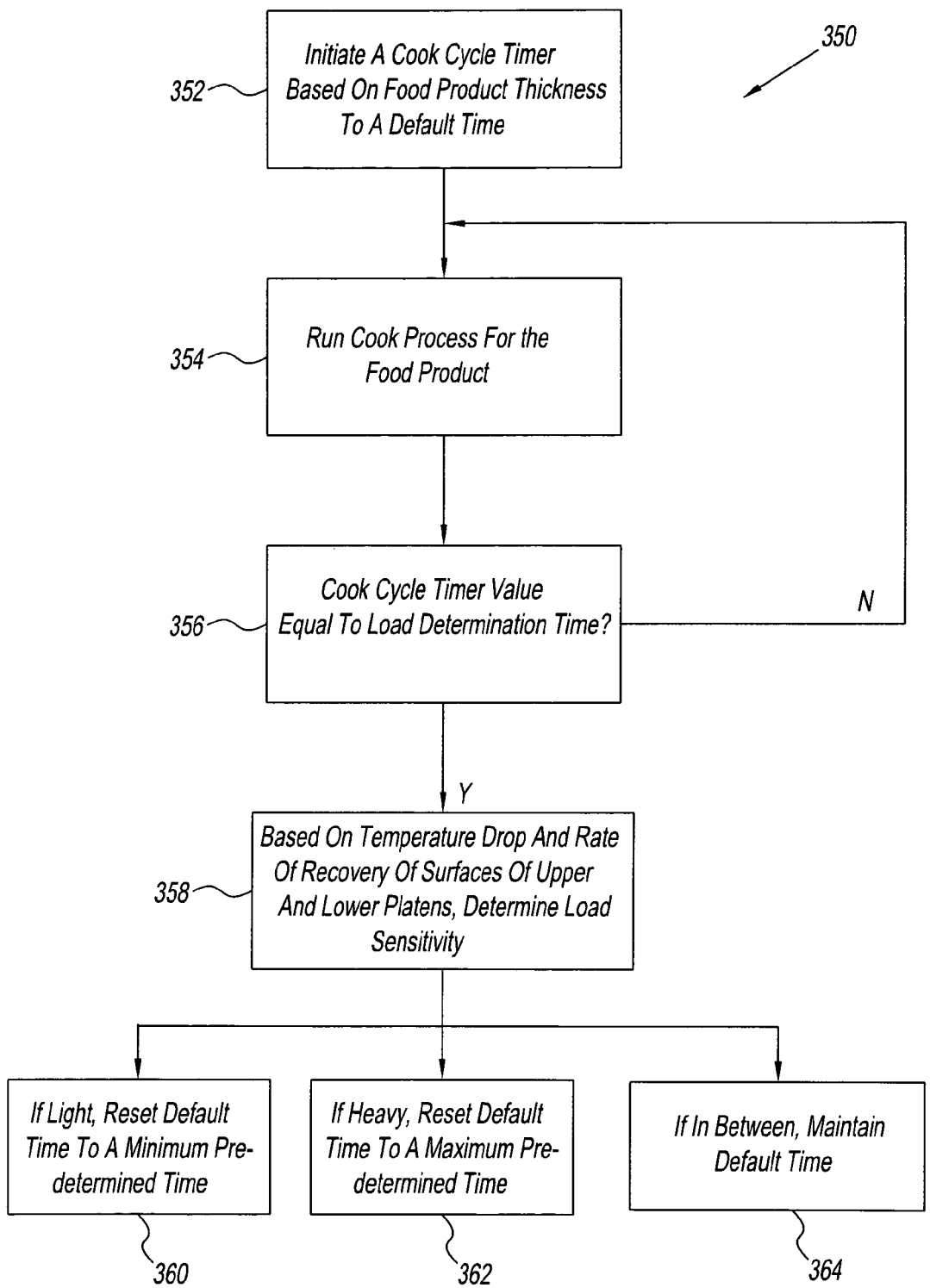
FIG. 17 is a flow diagram of a load sensitivity program that can be used with the cooking apparatus of FIG. 1.

Referring to FIG. 17, a load sensitivity program 350 is executed by controller 62. At step 352, a cook cycle timer is initiated based on thickness of the food product to a default or nominal time for the recognized food product. At step 354, controller 62 runs the cook process for the food product. At step 356, controller 62 determines if the current cook cycle timer value is equal to a predetermined load determination time. This predetermined time is preferably near the end of the default time. If no, steps 354 and 356 repeat until step 356 determines that the current cycle timer value equals the predetermined load determination time. If yes, at step 358, controller 62 determines a load sensitivity (light, heavy or in between) based on temperature drop and rate of recovery of surfaces 26 and/or 34 of lower and upper platens 24 and 32. If light, the default time is reset to a predetermined minimum time at step 360. If heavy, the default timer is reset to a maximum predetermined time at step 362. If in between, the default time is maintained at step 364. The predetermined minimum and maximum times can be determined by running cook cycles for the food products and recording cook cycle times for light, heavy and in between loads.

It will be apparent to those skilled in the art that the assignment of the default or nominal time to the in between time is a matter of choice and could alternatively be assigned to either the light or heavy load sensitivities with adjustments to the program procedure. Also, the load sensitivities could be rated in more or less than three categories if desired.

The present invention having been thus described with particular reference to the preferred forms thereof, it will be obvious that various changes and modifications may be made therein without departing from the spirit and scope of the present invention as defined in the appended claims.

What is claimed is:

1. A cooking apparatus comprising:
a first platen and a second platen;
a positioning mechanism that moves said second platen toward and away from said first platen; and
a controller that, when initially activated, operates in a preheat mode to control said positioning mechanism to move said second platen toward and into contact with said first platen until a signal is provided indicative of said second platen making contact with said first platen, wherein said controller stops said positioning mechanism, initiates a first platen heater and a second platen heater to preheat said first and second platens to preset temperatures, and performs a self-calibration.

2. The cooking apparatus of claim 1 wherein if an impediment is detected between an uppermost non-cooking position of said second platen and a predetermined distance above said first platen while said second platen is moving toward said first platen, said controller responds by controlling said positioning mechanism to stop said second platen and then to move said second platen away from said first platen toward said uppermost non-cooking position.

3. The cooking apparatus of claim 1, wherein said controller controls said positioning mechanism to maintain said second platen in contact with said first platen until at least a zone of said first platen attains a first preset temperature and said second platen attains a second preset temperature.

4. The cooking apparatus of claim 1, wherein said controller every time said preheat mode is performed also performs said self-calibration by recording a position of said second platen in contact with said first platen as a zero thickness value for a food product, and wherein said controller uses said recorded zero thickness value during ensuing cook cycles to recognize a thickness of said food product disposed on said first platen.

5. The cooking apparatus of claim 4, wherein said controller when performing said self-calibration further responds to said heaters attaining said preset temperatures by controlling said positioning mechanism to move said second platen away from said contact with said first platen to an uppermost non-cooking position and recording a value of a distance traveled, and wherein said zero thickness value and said distance traveled value are used to determine food product thickness during subsequent cooking procedures.

6. The cooking apparatus of claim 1, further comprising one or more temperature sensors disposed to sense one or more temperatures at one or more locations of said first platen; wherein said controller in a cook cycle uses said sensed temperatures to evaluate an amount of said food product on said first platen and compensates a cook time of said cook cycle based on said amount of said food product.

7. The cooking apparatus of claim 6, wherein said controller determines said load sensitivity by evaluating a drop in said temperatures and compensates said cook time based on said drop and a rate of temperature recovery.

8. The cooking apparatus of claim 1, further comprising one or more temperature sensors disposed to sense one or more temperatures at one or more locations of said first platen, a temperature probe that is manually disposable at said locations on a surface of said first platen and that is removably connected in circuit with said controller;
   wherein said controller calibrates surface temperature of the first platen based on temperature probe signals received from the temperature.

9. The cooking apparatus of claim 8, wherein said locations on said surface bear visible marks.

10. The cooking apparatus of claim 1, wherein said portion of said positioning mechanism, when moving toward said first platen, engages a detector and when moving away from said first platen, disengages said detector, which provides said signal.

* * * * *